United States Patent [19]

Katayama et al.

[11] 4,300,638
[45] Nov. 17, 1981

[54] AUTOMATIC POSITION CONTROL APPARATUS FOR GROUND WORKING VEHICLE

[75] Inventors: Yoshiyuki Katayama, Osaka; Shigekazu Hasegawa, Sakai; Shigeaki Okuyama, Kawachinagano; Norimi Nakamura, Sakai, all of Japan

[73] Assignee: Kubota, Ltd., Japan

[21] Appl. No.: 119,445

[22] Filed: Feb. 7, 1980

[30] Foreign Application Priority Data

Feb. 15, 1979 [JP] Japan .................................. 54/17575

[51] Int. Cl.³ .......................................... A01B 63/112
[52] U.S. Cl. ............................................ 172/10; 172/7
[58] Field of Search ................. 172/2, 7, 8, 9, 10, 172/11, 12; 37/DIG.1; 414/699, 700, 701

[56] References Cited

U.S. PATENT DOCUMENTS

| 4,015,729 | 4/1977 | Parquet et al. | 414/699 X |
| 4,064,945 | 12/1977 | Haney | 172/7 X |
| 4,132,272 | 1/1979 | Holloway et al. | 172/9 X |

FOREIGN PATENT DOCUMENTS

2508620  8/1975  Fed. Rep. of Germany .......... 172/7

*Primary Examiner*—Richard T. Stouffer
*Attorney, Agent, or Firm*—Kane, Dalsimer, Kane, Sullivan and Kurucz

[57] ABSTRACT

An automatic position control apparatus for a ground working vehicle equipped with a liftable working implement. The control apparatus is adapted to automatically control lifting and lowering of the implement so that the deviation of the draft value of the implement acutally detected by a draft detector from the draft value preset by a draft setting unit is maintained within a permissible range preset by a sensitivity setting unit. The control apparatus is characterized in that the apparatus includes a detector for detecting that the deviation is not decreasing outside the permissible range above the maximum permissible value thereof so as to automatically control the lift of the implement only while the deviation detector is in detecting operation.

4 Claims, 4 Drawing Figures

AUTOMATIC POSITION CONTROL APPARATUS FOR GROUND WORKING VEHICLE

BACKGROUND OF THE INVENTION

The present invention relates to an automatic position control apparatus for a ground working vehicle equipped with a liftable working implement, and more particularly to such a control apparatus by which lifting and lowering of the working implement can be automatically controlled so that the deviation of the draft value of the working implement actually detected by a draft detector from the draft value preset by a draft setting unit is maintained within a permissible range preset by a sensitivity setting unit.

Automatic position control apparatus of this type are provided for maintaining the ground working implement at a constant level above the ground with a so-called position control system while, at the same time, preventing an engine stop of the working vehicle or damage to the implement with a draft control system responsive to the draft of the implement.

Such automatic position control apparatus heretofore known are adapted to automatically control the lift of the working implement during the entire period of time when the above-mentioned deviation is above the maximum permissible value of a preset permissible range. In this case, the automatic lift control is discontinued when the deviation has decreased to the permissible range, entailing electrical, mechanical or hydraulic hysteresis and a lag of operation. This leads to excessive lift control of the implement and excessive deviation of the implement from the specified level relative to the ground. Further when the permissible draft deviation range is narrow for high-sensitivity control, there arises another problem that the excessive lift control mentioned causes hunting which impairs stable control.

These problems are attributable to the fact that attention has been directed solely to the protection of the working vehicle and implement from excessive load of draft. In other words, it has not been contemplated to assure automatic high-sensitivity lift or lowering control with consideration given to the above-mentioned hysteresis.

SUMMARY OF THE INVENTION

In view of the foregoing problems, an object of the invention is to prevent the hunting due to the excessive lift control stated above and to thereby assure stable automatic lift and lowering control with high overall sensitivity.

The automatic position control apparatus of this invention for a ground working vehicle equipped with a liftable working implement is adapted to automatically control lifting and lowering of the working implement so that the deviation of the draft value of the working implement actually detected by a draft detector from the draft value preset by a draft setting unit is maintained within a permissible range preset by a sensitivity setting unit. The control apparatus is characterized in that it includes a detector for detecting that the deviation is not decreasing outside the permissible range above the maximum permissible value thereof so as to automatically control lift of the working implement only while the detector is in detecting operation.

Thus the lift of the working implement is controlled only while the deviation is not decreasing outside the permissible range above the maximum permissible value thereof, so that when the deviation is above the maximum permissible value of the permissible range and is decreasing, the lift control of the working implement has already been discontinued. If the automatic lift control is discontinued upon the decrease of the deviation to the preset permissible range, the resulting lag of operation would entail excessive lift control, whereas the present apparatus does not involve such excessive control. Even if the preset permissible deviation range is narrow to ensure high-sensitivity control, stable draft control can be effected free of hunting.

Other objects and advantages of the present invention will become apparent from the following description.

BRIEF DESCRIPTION OF THE DRAWINGS

The drawings show an automatic position control apparatus embodying the invention and adapted for use in a ground working vehicle.

DESCRIPTION OF THE PREFERRED EMBODIMENT

Figure 1:
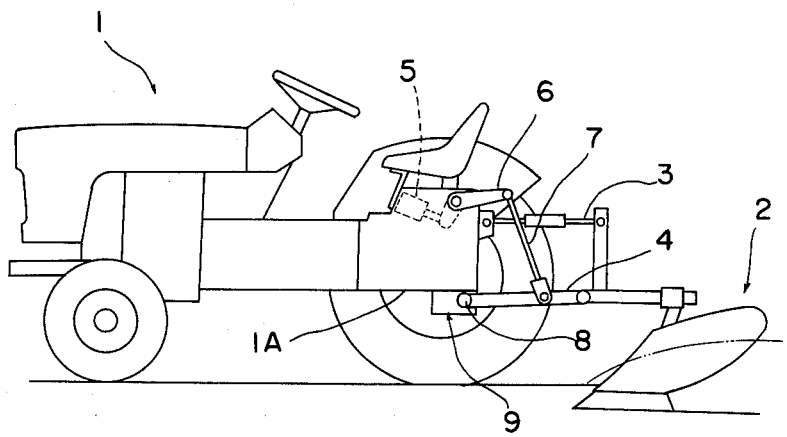
FIG. 1 is a side elevation showing a farm tractor in its entirety.

FIG. 1 shows a tractor 1 serving as a ground working vehicle and equipped with a plow 2 as a ground working implement. The plow 2 is liftably connected to the rear portion of the tractor 1 by a top link 3 and a pair of lower links 4, 4. In response to an electric signal, one of the hydraulic control valves to be described later is selectively operated to expand or contract a hydraulic cylinder 5 housed in a transmission case 1A on the tractor 1 and pivotally raise or lower a pair of lift arms 6, 6 operatively connected to the hydraulic cylinder 5. By way of lift rods 7, 7 and the lower links 4, 4, this movement of the lift arms 6, 6 raises or lowers the plow 2.

Figure 2:
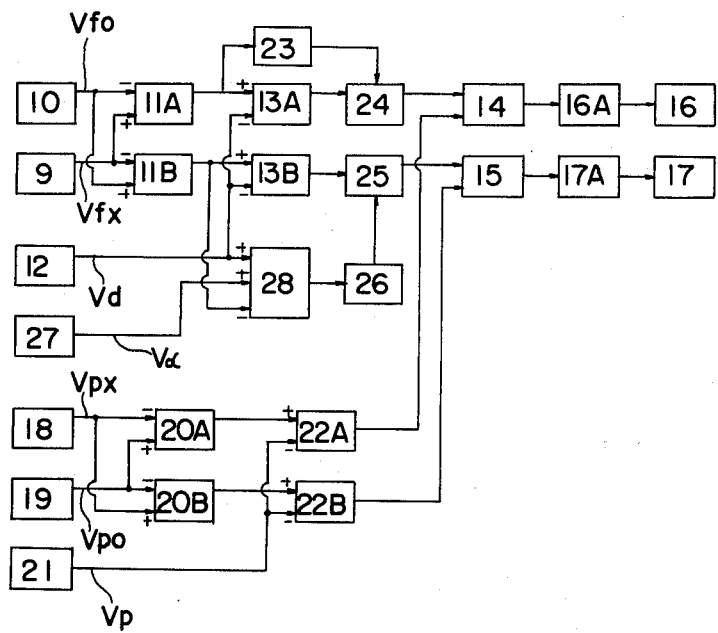
FIG. 2 is a block diagram showing an overall position control system.

FIG. 2 shows an automatic position control apparatus for the plow 2. The control apparatus comprises a draft control system for automatically controlling the position of the plow 2 so that the deviation of the actually detected draft value of the plow from the preset draft value will be maintained within a permissible range, and a position control system for automatically controlling the position of the plow 2 to bring the plow into proximity to the target level which is intentionally variable in accordance with the level of the plow 2 detected relative to the tractor 1. The draft control system has the following construction.

The system includes a draft detector 9 by which the deflection of the connecting rod 8 of the lower links 4, 4 due to the pulling force acting on the rod 8 through the links 4, 4 is detected as the actual draft of the plow 2, and a draft setting unit 10 for varying and presetting the proper draft value in accordance with the working depth for the plow 2 and the hardness of the ground. The draft value Vfx actually detected by the draft detector 9 and the draft value Vfo preset by the draft setting unit 10 are fed to first and second subtracting units 11A, 11B respectively to calculate the draft deviation [Vfx-Vfo] (hereinafter represented by "a"). Lifting and lowering comparators 13A, 13B receive the deviation a from the subtracting units 11A, 11B and a permissible set deviation Vd from a draft sensitivity setting unit 12 which is capable of varying the permissible range A of deviations a.

The lifting and lowering comparators 13A, 13B judge whether or not the deviation a from the first or second subtracting unit 11A or 11B is in the range A of from a maximum permissible value b to a minimum permissible value b′ set by the draft sensitivity setting unit 12. The comparators apply a lift or lowering control signal to a drive circuit 16A for a lifting valve 16 or to a drive circuit 17A for a lowering valve 17 via an OR circuit 14 or AND circuit 15 to automatically control the lift or lowering of the plow 2 so that the deviation a will be maintained within the permissible range A. In other words, the permissible range A can be termed a range for halting the plow against lifting or lowering.

The position control system has the following construction.

The system includes a level detector 18 for detecting the actual level of the plow 2 relative to the tractor 1 from the angle of turn of the lift arms 4, 4, and a level setting unit 19 for intentionally varying the target level of the plow 2 relative to the tractor 1. The value Vpx detected by the level detector 18 and the value Vpo set by the level setting unit 19 are fed to third and fourth subtracting units 20A, 20B respectively to calculate the level deviation. Lifting and lowering comparators 22A, 22B receive the deviation from the subtracting units 20A, 20B and a permissible set deviation Vp from a position sensitivity setting unit 21 for setting the permissible range of level deviations.

The lifting and lowering comparators 22A, 22B judge whether or not the deviation from the third or fourth subtracting unit 20A or 20B is in the range of from a maximum permissible value to a minimum permissible value set by the position sensitivity setting unit 21. The comparators apply a lift or lowering control signal to the drive circuit 16A of the lifting valve 16 or to the drive circuit 17A of the lowering valve 17 via the OR circuit 14 or AND circuit 15 to automatically control the lift or lowering of the plow so that the deviation will be maintained within the set permissible range.

The position of the plow 2 is automatically controlled so that the draft deviation a is in proper balance with the level deviation. When the draft deviation a exceeds the maximum permissible value b or decreases below the minimum permissible value b′ with a variation in the actually detected draft Vfx, the lift or lowering of the plow will be controlled to stabilize the draft, while the rise or fall of the plow will produce a variation in the level deviation. Accordingly the draft variation a is adapted to be maintained within the permissible range A while permitting the plow to rise or lower an amount which is smaller by the amount corresponding to the variation in the level deviation. Briefly the automatic position control is effected in accordance with the variation of the actually detected draft value Vfx while allowing the plow 2 to position close to the target level to the greatest possible extent.

Figure 3:
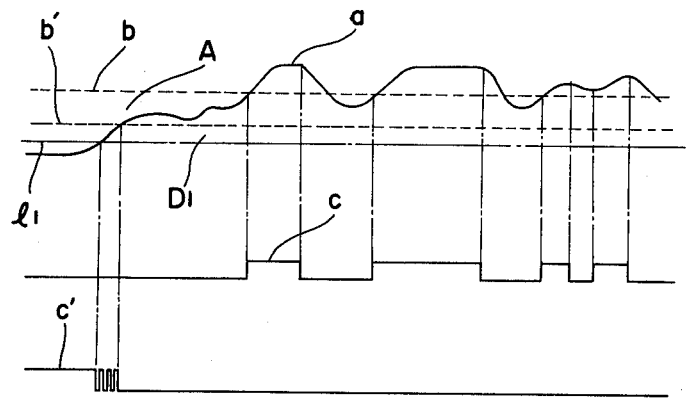
FIG. 3 is a graph showing the relation of position control relative to varying deviations.

The present control apparatus further includes a detector 23 for detecting that the draft deviation a is not decreasing toward the maximum permissible setting b, based on the variation per unit time of the draft deviation a given by the first subtracting unit 11A of the draft control system. In other words, the detector 23 detects that the deviation a is increasing or is constant. The apparatus further includes a lift preventing circuit 24 which is adapted to operate only while the detector 23 is out of detecting operation, to stop application of the control signal from the lifting comparator 13A to the drive circuit 16A of the lifting valve 16. Therefore, while the detector 23 detects that the draft deviation a is not decreasing toward the maximum permissible setting b, the lifting comparator 13A feeds a lifting control signal c to the drive circuit 16A of the lifting valve 16 through the OR circuit 14 as shown in FIG. 3 so as to automatically control the lift of the plow 2. A substantially equivalent effect is achievable even if the detector 23 is adapted to detect only that the deviation a is increasing or is constant. The object of the invention can be fulfilled also when the apparatus is adapted to intermittently interrupt automatic lift of the plow while the detector 23 is in detecting operation. Although the draft deviation a from the first subtracting unit 11A is fed to the detector 23 according to the present embodiment, the actually detected draft value Vfx from the draft detector 9 can be applied directly to the detector 23.

To automatically control the lowering of the plow by the draft control system, a lowering control signal c′ is fed from the lowering comparator 13B to the drive circuit 17A of the lowering valve 17 through the AND circuit 15 while the draft deviation a from the second subtracting unit 11B is below the minimum permissible setting b′.

Furthermore there is provided a judging unit 28 for receiving the draft deviation a from the second subtracting unit 11B of the draft control system, the permissible deviation setting from the draft sensitivity setting unit 12, and a reference draft value Vα, set by a second draft setting unit 27, for judging whether or not the draft deviation a has increased by more than a definite value based on the minimum permissible setting b′. The judging unit 28 judges the draft deviation a from the second subtracting unit 11B to be small when it is in the range of from the minimum permissible setting b′ to the reference draft value Vα, or to be large when it is above the value Vα. When the draft deviation a has been judged to be small by the unit 28, an oscillator circuit 26 functions in response to the judgment, emitting a pulse signal of high frequency (e.g. 60 Hz) to energize a lowering preventing circuit 25, which in turn intermittently stops the lowering signal from the lowering comparator circuit 13B. Conversely if the draft deviation a has been judged to be large by the unit 28, the oscillator circuit 26 does not function based on the judgment, holding the lowering preventing circuit 25 out of operation and permitting the lowering signal from the comparator 13B to drive the valve 17 continuously.

Thus when the absolute value of the deviation a is large, the valve 17 is operated in response to the variation of the deviation a to efficiently control the position of the plow 2, whereas if the absolute value of the deviation a is small, the valve 17 is operated for relatively short periods of time with a pulse signal of high frequency, based on the variation of the deviation a. This serves to inhibit the jerky movement of the tires and abrupt reduction in the propelling force that would result from an abrupt drop of the pressure of the cylinder especially when controlling the lowering of the plow 2. The position of the plow 2 is therefore controllable without giving a severe shock to the operator.

Figure 4:
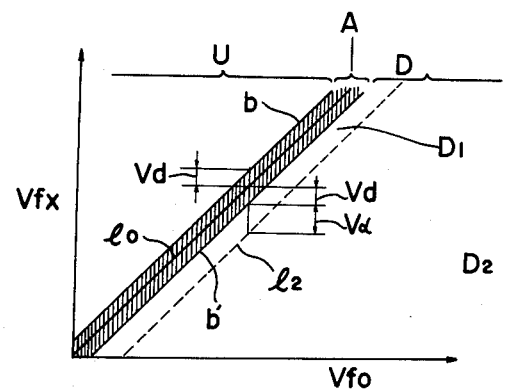
FIG. 4 is a graph showing ranges of control operations.

With reference to FIGS. 3 and 4 showing the position control operation ranges by draft control, indicated at $l_1$ is a draft setting line, at b a line of maximum permissible values, and at b′ is a line indicating minimum permissible values. The region between the lines b and b′, namely, the permissible sensitivity range A is a range for halting the plow against lifting or lowering. The region above the line b is a lifting range U, and the region below the line b' is a lowering range D. Indicated at $l_1$ a reference draft line obtained by adding a definite value (set by the second draft setting unit 27) to the line b' for determining intermittent lowering. The region between the line $l_1$ and the range A is an intermittent lowering range $D_1$, and the region below the line $l_1$ is a continuous lowering range $D_2$.

The range of draft deviations may be divided into three stages for controlling the lowering of the plow 2 by comparative judgment, such that the lowering valve 17 is operated with a continuous lowering signal when the draft deviation a is judged to be large, or with a pulse signal of 30 Hz when the deviation a is judged to be medium, or with a pulse signal of 60 Hz when the deviation a is judged to be small.

The control means for operating the valve with such pulse signals of different frequencies can be incorporated into the draft control system for automatically controlling the lift of the plow.

We claim:

1. An automatic position control apparatus for a ground working implement attached to a working vehicle vertically oscillatable by hydraulic means, the control apparatus being adapted to automatically control position of the working implement so that deviation of an actual draft value of the ground working implement from a preset optimum draft value is maintained within a permissible range, said control apparatus comprising:

a draft setting unit for presetting said optimum draft value;

a draft detector for detecting said actual draft value;

subtracting means for calculating the deviation of said actual draft value from said optimum draft value;

a sensitivity setting unit for setting a maximum permissible value and a minimum permissible value of said permissible range;

comparing means for comparing said deviation with said maximum permissible value and minimum permissible value and for transmitting a lifting control signal to cause said hydraulic means to lift said working implement when said deviation is greater than said maximum permissible value and to transmit a lowering control signal to cause said hydraulic means to lower said working implement when said deviation is smaller than said minimum permissible value;

a detector for detecting, when said deviation is greater than said maximum permissible value, whether or not said deviation is decreasing; and a lift preventing circuit responsive to detections by said detector for stopping said lifting control signal when said deviation is greater than said maximum permissible value and is at least decreasing;

whereby said ground working implement is lifted only when said deviation is greater than said maximum permissible value of the permissible range and is increasing or remaining constant.

2. An automatic position control apparatus as defined in claim 1 further comprising:

a second draft setting unit for setting a reference draft value smaller than said minimum permissible value of the permissible range;

a judging unit for comparing said deviation with said minimum permissible value and said reference draft value to detect whether or not said deviation is between said minimum permissible value and said reference draft value; and a pulse transmitting circuit and a lowering preventing circuit responsive to detections by said judging unit and capable of intermittently stopping said lowering control signal when said deviation is between said minimum permissible value and said reference draft value, whereby said ground working implement is intermittently lowered when said deviation is between said minimum permissible value of the permissible range and said reference draft value.

3. An automatic position control apparatus as defined in claim 2 further comprising electromagnetic valves for actuating said hydraulic means, and drive circuits for operating said electromagnetic valves, said lifting control signal and said lowering control signal being fed to said drive circuits.

4. An automatic position control apparatus as defined in claims 1, 2, or 3 wherein said lifting preventing circuit is adapted, in response to the detections by said detector, to stop said lifting control signal when said deviation is greater than said maximum permissible value and not only is decreasing but also remaining constant, whereby said ground working implement is lifted only when said deviation is greater than said maximum permissible value of the permissible range and is increasing.

* * * * *